(12) United States Patent
Ayabakan et al.

(10) Patent No.: US 10,581,228 B2
(45) Date of Patent: Mar. 3, 2020

(54) CABLE PROCESSING MACHINE WITH IMPROVED PRECISION MECHANISM FOR CABLE PROCESSING

(71) Applicant: SCHLEUNIGER HOLDING AG, Thun (CH)

(72) Inventors: Mustafa Ayabakan, Wängi (CH); Martin Stier, Werne (DE)

(73) Assignee: SCHLEUNIGER HOLDING AG, Thun (CH)

(*) Notice: Subject to any disclaimer, the term of this patent is extended or adjusted under 35 U.S.C. 154(b) by 0 days.

(21) Appl. No.: 16/229,817

(22) Filed: Dec. 21, 2018

(65) Prior Publication Data
US 2019/0131779 A1    May 2, 2019

Related U.S. Application Data (62) Division of application No. 15/068,563, filed on Mar. 12, 2016, now Pat. No. 10,177,547.

(30) Foreign Application Priority Data

Mar. 12, 2015 (EP) .................................... 15158890

(51) Int. Cl.
   *H02G 1/12* (2006.01)
   *G05B 19/418* (2006.01)
(52) U.S. Cl.
   CPC ......... *H02G 1/1248* (2013.01); *G05B 19/418* (2013.01)
(58) Field of Classification Search
   CPC .. H02G 1/1248; H02G 1/1251; H02G 1/1253; H02G 1/1256; H02G 1/1258;
   (Continued)

(56) References Cited

U.S. PATENT DOCUMENTS 3,084,574 A * 4/1963 Folkenroth .......... H02G 1/1248
                                                          81/9.51
4,519,027 A   5/1985 Vogelsberg
(Continued)

FOREIGN PATENT DOCUMENTS

DE   10 2007 001 266 A1    7/2008
DE   10 2007 025 796 A1   12/2008
(Continued)

OTHER PUBLICATIONS

Schleuniger Reference Manual 7.0 for PowerStrip 9550, p. 80, dated May 2014 See Spec., p. 10.

*Primary Examiner* — Jason Daniel Prone
*Assistant Examiner* — Richard D Crosby, Jr.
(74) *Attorney, Agent, or Firm* — Davis & Bujold PLLC; Michael J. Bujold (57) ABSTRACT

A method for processing a cable on a cable processing machine which includes a cable processing station with a cable processing tool. An interface receives at least one physical parameter value, from a sensor, indicating a capability of the cable processing machine for executing a processing step. A capability determination component determines, based on the physical parameter, that the capability is insufficient. A voice instruction generator component generates voice instructions for an operator, relating to an action to be performed for restoring the capability of the cable processing machine to enable execution of the processing step. Voice instructions are output generated and sent to wearable audio device associated with operator. A confirm component receives confirmation that action for restoring the capability of the cable processing machine is complete, and the capability determination component validates restoration of the capability. Once capability is (Continued)

restored, the cable processing tool executes the processing step.

3 Claims, 5 Drawing Sheets

(58) Field of Classification Search
CPC .. H02G 1/1263; H02G 1/1265; H02G 1/1268; H02G 1/127
See application file for complete search history.

(56) References Cited

U.S. PATENT DOCUMENTS

| | | | |
|---|---|---|---|
| 6,718,624 B1* | 4/2004 | Rohrbach | B65H 54/56 140/92.2 |
| 6,941,248 B2 | 9/2005 | Friedrich et al. | |
| 7,296,956 B2 | 11/2007 | Dirnfeldner | |
| 7,681,476 B2 | 3/2010 | Fritsche | |
| 9,083,167 B2* | 7/2015 | Wang | H02G 1/126 |
| 9,397,488 B2* | 7/2016 | Viviroli | H02G 1/1253 |
| 9,516,996 B2 | 12/2016 | Diolaiti et al. | |
| 9,717,563 B2 | 8/2017 | Tognaccini et al. | |
| 9,791,397 B2* | 10/2017 | Deschler | H02G 1/1248 |
| 2002/0046368 A1 | 4/2002 | Friedrich et al. | |
| 2002/0067372 A1 | 6/2002 | Friedrich et al. | |
| 2002/0069072 A1 | 6/2002 | Friedrich et al. | |
| 2003/0167893 A1* | 9/2003 | Morris | A47K 10/36 83/649 |
| 2004/0046711 A1 | 3/2004 | Triebfuerst | |
| 2004/0134965 A1* | 7/2004 | Stepan | H02G 1/1248 228/1.1 |
| 2004/0181935 A1 | 9/2004 | Rohrbach et al. | |
| 2004/0255723 A1* | 12/2004 | Palmowski | H02G 1/1265 81/9.51 |
| 2010/0154609 A1* | 6/2010 | Cody | G02B 6/4475 83/23 |
| 2011/0174115 A1* | 7/2011 | Shimizu | H02G 1/1256 81/9.51 |
| 2013/0125710 A1* | 5/2013 | Hombu | H01R 43/28 81/9.51 |
| 2014/0025339 A1* | 1/2014 | McAdam | G05B 19/0425 702/188 |
| 2014/0083273 A1* | 3/2014 | Vallance | B26D 3/08 83/880 |
| 2014/0375799 A1 | 12/2014 | Probin et al. | |
| 2015/0128399 A1* | 5/2015 | Meierhans | H02G 1/1248 29/426.3 |
| 2015/0260928 A1* | 9/2015 | Robichaud | G02B 6/3898 83/488 |

FOREIGN PATENT DOCUMENTS

| | | |
|---|---|---|
| WO | 00/62381 A1 | 10/2000 |
| WO | 2008/152551 A1 | 12/2008 |
| WO | 2014/147596 A1 | 9/2014 |

* cited by examiner

CABLE PROCESSING MACHINE WITH IMPROVED PRECISION MECHANISM FOR CABLE PROCESSING

This application claims benefit of priority to prior European (EPO) application no. EP15158890 filed on Mar. 12, 2015 and the entirety of prior European application no. EP15158890 is hereby expressly incorporated herein by reference, in its entirety and as to all its parts, for all intents and purposes, as if set forth identically in full herein.

TECHNICAL FIELD

The present invention generally relates to cable processing machines, and more particularly, relates to improving the precision of a cable processing machine for cable processing.

BACKGROUND

Standard cable processing machines, hereinafter also referred to as 'machines', perform processing steps in the context of cable production. Multiple machines may be clustered in a machine center where multiple cable processing steps may be consecutively executed in an automated sequence. A machine center may also be considered to be a machine in the sense of the terminology and description within the present application. Examples for cable processing steps are: cutting cables at a desired length, removal of insulation at the cable ends (cable stripping), crimping of cable ends, etc. A machine may be equipped with one or more production tools to perform such a production step. For example, cable strippers may be used for removing insulation material from single wires, multi-conductor cables, or coax and optical fiber cables. An example of a cable stripper with rotative blades is disclosed in the published PCT patent application WO 2008/152551A1. It is also possible to cluster multiple tools in a machine center (e.g., a crimp center) where multiple production steps may be performed in an automated manner. For example, such an automatic machine or machine center may include respective production tools that are configured for cutting, stripping, crimping, sealing, twisting and tinning of cables. Standard cable processing machines and machine centers with the above described functions are commercially available from Schleuniger Group in Thun, Switzerland. Specific machines are disclosed at Schleuniger's homepage at www.schleuniger.ch.

High precision of each production tool is required to ensure cable processing with correct length and correct insulation and robustness, etc. The precision of a cable processing machine is typically monitored through physical parameters that indicate the capability of the cable processing machine for cable processing steps. For example, the blades or knives of a stripping tool used for removing insulation material from the cable ends may no longer be sharp enough to guarantee appropriate removal of the insulation (stripping). In such case the contact pressure between the blades or knives and the cable insulation (measurable through appropriate sensors) may not be in a predefined range of tolerances which, however, is necessary to achieve the required precision. In this case, an operator is needed to resolve the issue and restore the machine's stripping capability for regaining the required precision. The term "operator" as used hereinafter refers to a resource for operating the cable processing machine. Operating in this sense includes but is not limited to providing maintenance activities and performing production support activities. An "operator" in the sense of this disclosure may be a living creature, such as a human operator, or a robot that may be voice controlled. However, operators may not be available in the vicinity of the cable processing machine and they may make errors once attending the machine if they are not fully aware of what to do. This may result in a situation where the machine no longer has capability to produce high precision cables, until such capability is restored by an operator. Existing cable processing machines provide instructions to operators via a display of the machine. However, this requires the operator to be in the immediate vicinity of the machine for being notified and for executing the corresponding actions. There could be a negative impact on the quality of the performed actions because the operator may not be able to simultaneously use eyes and hands for the parametrization of the machine which finally determines the precision of the cable processing steps.

SUMMARY

There is therefore a need for an improved interface to improve communication between cable processing machines and operators for reducing the time to restore the machine capability and resume cable processing with the required precision of the machine's production tools, so as to avoid failure during cable processing.

The prior published US 2013/0125710A1 discloses a device for stripping coating from electric wires, this device being provided with a function to detect any contact between a wire core and stripping blades. This device has a signal analyzer circuit for measurement of impedance, via stripping blades capable of detecting any contact between the stripping blades and the wire core, by detecting a change in impedance as a result of addition of impedance of the wire core to that of the stripping blades at the moment of any contact of the stripping blades with the core of the electric wire in the course of stripping coating from the electric wire. There is, however, no means for monitoring physical parameters of the machine indicative of its capability of correctly and appropriately processing the wires within the desired and required parameters of processing. Only the processing sequence itself is monitored for the correct operation. There is no disclosure of any voice instructions given to an operator of the device.

The latter voice instruction generator is lacking in the prior published US 2004/0255723A1 as well. This published application discloses a wire processing apparatus with an electronic memory for storing values commensurate with the lengths from a terminal end of the wire to the positions of cuts to be made through the plurality of coating layers, and a mechanical store for the control of the depths of each cut. The electronic memory is preferably adapted to receive inputs representing parameters of sequential steps in each of two processing operations, and to perform such operations alternately, upon different wire ends, upon successive actuations of the apparatus. Further disclosed are alternatives to a manually operable actuator, in order to allow an operator to use his hands fully for handling the cables. Besides using a pedal any other means of actuation like voice actuated actuation or the like could be used. There is, however, no voice generator for generating voice instructions from the machine to the operator, indicative of maintenance or repair work to be done or indicative of adaptations needed for achieving the desired or required processing of the products.

The above technical problem may be solved by versions within the scope of the present disclosure taking the form of a cable processing machine which may be part of a cable processing machine center, and a method for producing cables on such a machine or machine center. A cable processing machine center typically includes a plurality of cable processing machines (sometimes also referred to as cable processing stations) that may perform different cable processing steps. A cable processing station may include one or more processing tools to perform those steps.

The cable processing machine or station has an interface configured to receive from at least one sensor at least one physical parameter value indicating a capability of the cable processing machine in executing a particular cable processing step. For example, such a physical parameter may be the contact pressure of the blades or knives of a stripping tool as mentioned above, or the contact pressure between transport rollers of a cutting tool and the to-be-transported cable, which is an important indicator for the precision of the capability to cut the cable with the correct cable length. Further physical parameters that may be measured by respective sensors shall be discussed in the detailed description. A sensor for measuring the physical parameter value may be an integral part of the cable processing machine or of the respective machine tool. In both versions, the interface is a machine internal interface, and the sensor may communicate with the other parts of the machine, for example, over an internal bus. The sensor may also be an integral part of a separate measuring device, in which case the interface is an external interface that may receive the sensed physical parameter values from outside the machine. For example, a physical parameter value may be received from an operator of the measuring device via voice instructions through a voice interface.

The cable processing machine further has at least one processor that may execute software components stored in a respective memory of the machine. The processor may also be a multi-core processor or any other processor that is appropriate to execute the instructions of the software components. A capability determination component allows the cable processing machine to determine, based on the at least one physical parameter, that the capability which is characterized by the at least one physical parameter, is insufficient for executing the cable processing step. For example, for each physical parameter a data set may be stored that defines a predefined tolerance range for the respective physical parameter. As long as the physical parameter lies within this tolerance range, the capability determination component considers the respective capability as sufficient to perform the production step. However, if the sensed physical parameter value falls outside the predefined tolerance range, the capability determination component determines that the respective capability is insufficient.

In the latter case, a voice instruction generator component generates voice instructions for an operator. The voice instructions are related to an action to be performed by the operator for restoring the capability of the cable processing machine to enable the execution of the cable processing step. The voice instructions are configured for audio output generation on a particular wearable audio device associated with the operator. The generated voice instructions are then sent to the particular wearable audio output device.

In one version, a data storage component of the machine stores capability restoration data including technical instructions regarding action to be performed by the operator. The technical instructions are a basis for the voice instructions to be generated. For example, the capability restoration data may be configurable by a user (that can be different from the operator). In other words, the capability restoration data provides the knowledge about how to restore the insufficient capability. This knowledge is communicated to the operator via the voice instructions.

In one version, voice instruction files may be stored in the memory of the machine. The files may be assembled according to the technical instructions of the capability restoration data, and then be transmitted to the wearable audio output device of the operator. In an alternative, the voice instruction generator component may generate one or more text files including the voice instructions. The text files are transmitted to the wearable device, and a standard text-to-speech converter of the wearable audio output device transforms the text instructions into spoken natural language instructions.

The voice instructions may be sent directly to the wearable device of the operator if the operator is assigned to the cable processing machine. In case of multiple operators, the voice instructions may be sent via an intermediary system that can select a particular operator for the cable processing machine and forward the voice instructions to this particular operator.

Once the operator has completed the action according to the voice instructions, a confirm component receives a confirmation that this action for restoring the capability of the cable processing machine is completed. For example, such confirmation may be received from the operator via voice instructions, or from a wearable sensor device of the operator. The confirmation may also be received from machine internal components (e.g., production tools, sensors, capability determination component) in cases where the machine is able, on its own, to determine that the action was completed.

Then, the capability determination component validates whether the capability is restored. In case of receiving a confirmation that is in conflict with the technical status information of the machine (i.e., the physical parameter(s) indicate that the capability has not yet been restored), the voice generation component continues to send instructions to the operator until, finally, the capability is restored. Only when the capability is restored may the respective production tool(s) execute the cable processing step.

Further aspects within the scope of the present disclosure shall be understood as realized and attained by the elements and combinations particularly described and depicted. It should be understood that the foregoing general description as well as the following detailed description are intended as exemplary and explanatory only, and are not intended as restrictive of the invention as described. Further advantages, features and details according to the present disclosure shall be apparent from the following description, in which some exemplary versions of the invention are described with reference to the drawings. Some exemplary possible realizations of systems, apparatus and methods according to the present disclosure may be understood in greater detail on the basis of the attached drawings and accompanying description, without necessarily restricting the claimed scope of protection merely to specific exemplary disclosure. The figures are described in a cohesive and comprehensive manner, the same reference symbols denote the same components, and any reference symbols with different indices specify functionally identical or similar components.

DETAILED DESCRIPTION

In the present description, numerous specific details are set forth in order to provide a thorough understanding of exemplary versions of the present invention. It shall be apparent, however, to one skilled in the art, that some versions of the present invention may be practiced without some of these specific details. Indeed, reference in this specification to "one version," "a/the version," "one embodiment," "an/the embodiment," "a/the variant," and "one variant," should be understood to mean that a particular feature, structure, or characteristic described in connection with the version, variant, or embodiment is included in at least one such version, variant, or embodiment of the disclosure. Thus, the appearances of phrases "in one version," "in one embodiment", "in one variant," and the like in various places in the specification are not necessarily all referring to the same variant, version, or embodiment, nor are separate or alternative versions, variants or embodiments mutually exclusive of other versions, variants, or embodiments. Moreover, various features are described which may be exhibited by some versions, variants, or embodiments and not by others. Similarly, various requirements are described which may be requirements for some versions, variants, or embodiments but not others. Furthermore, as used throughout this specification, the terms 'a', 'an', 'at least' do not denote a limitation of quantity, but rather denote the presence of at least one of the referenced item in the sense that singular reference of an element does not necessarily exclude the plural reference of such elements. Concurrently, the term "a plurality" denotes the presence of more than one referenced items. Finally, the terms "connected" or "coupled" and related terms are used in an operational sense and are not necessarily limited to a direct connection or coupling.

Figure 1:
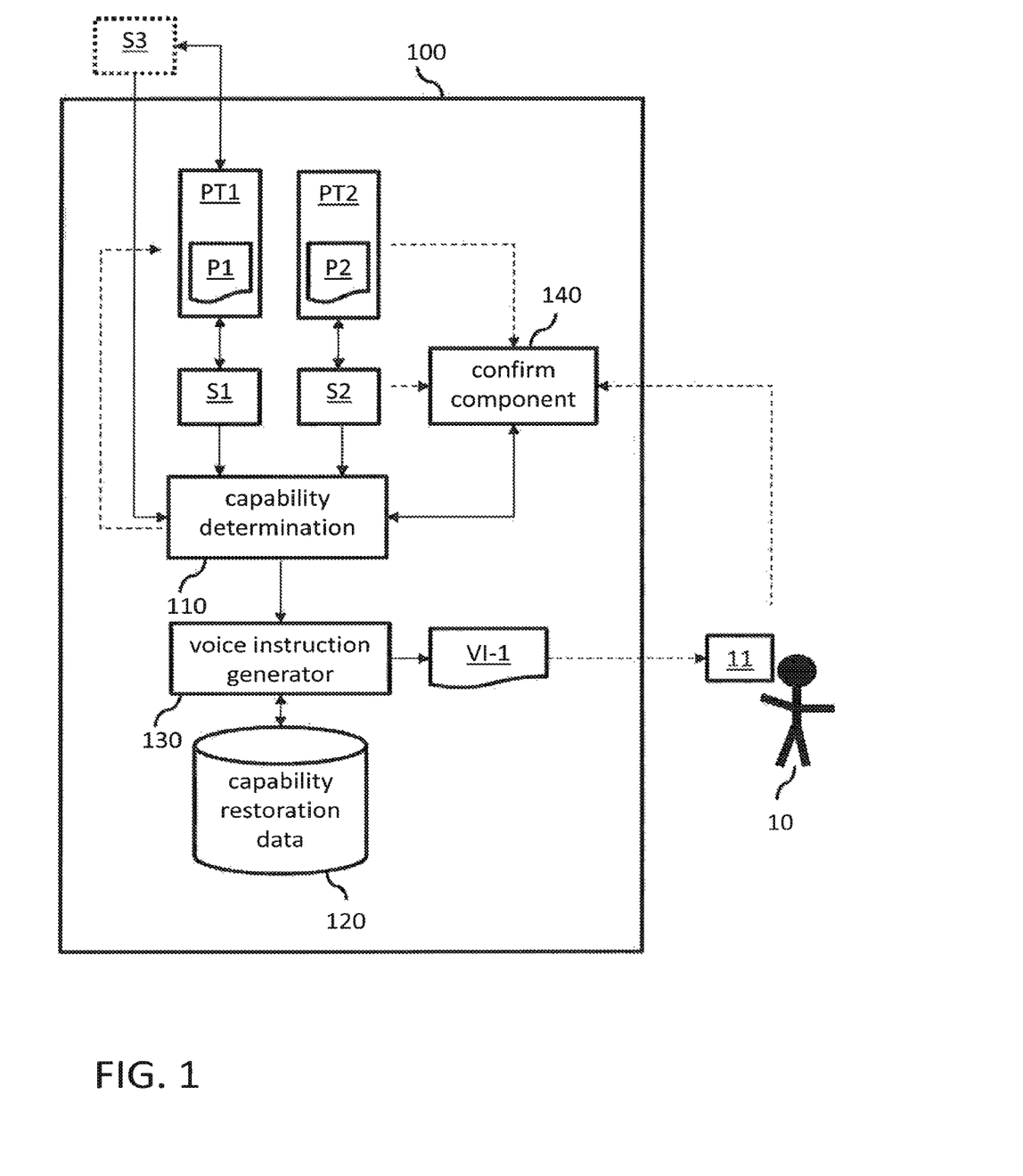
FIG. 1 is a simplified block diagram of a cable processing machine according to a version within the scope of the present disclosure.

FIG. 1 is a simplified block diagram of a cable processing machine 100 according to a version within the scope of the present disclosure. The machine 100 has one or more cable processing tools PT1, PT2. Examples of the tools of the machine 100 may be: a cable feeding unit, a cable straightening unit, a cable cutting unit, a cable stripping unit, a cable crimping unit, or any other tool configured to perform one or more particular cable processing steps in a cable production process. A person skilled in the art of cable processing machines knows all those various functions and aspects very well, as they can be found in commercially available cable processing machines. In the following example, it is assumed that PT1 is a cable stripping unit and PT2 is a cable crimping unit. However, the teachings of the present disclosure may be readily applied by a person skilled in the art to any other tool of the machine 100.

The function and/or precision of the various processing tools (e.g., stripping unit PT1, crimping unit PT2) may be monitored by appropriate sensors S1, S2, S3 that may be integrated in the machine 100, or that may be provided by external measurement devices. Such sensors are set up to measure physical parameters indicating capabilities of the respective cable processing tools for executing a respective cable processing step.

For controlling and monitoring the technical functioning of the machine 100, the machine further has a memory that is configured to store data and/or instructions executable by one or more processors of the machine 100. According to a version within the scope of the present disclosure, the instructions when being executed by the processor(s) implement a capability determination component 110, a voice instruction generator component 130, a capability restoration data storage component 120, a confirm component 140, as a well as appropriate interface components configured to enable communication between the various components of the machine 100 and between the machine 100 and operator 10 (directly or through further communication systems, such as through audio output device 11).

Figure 2:
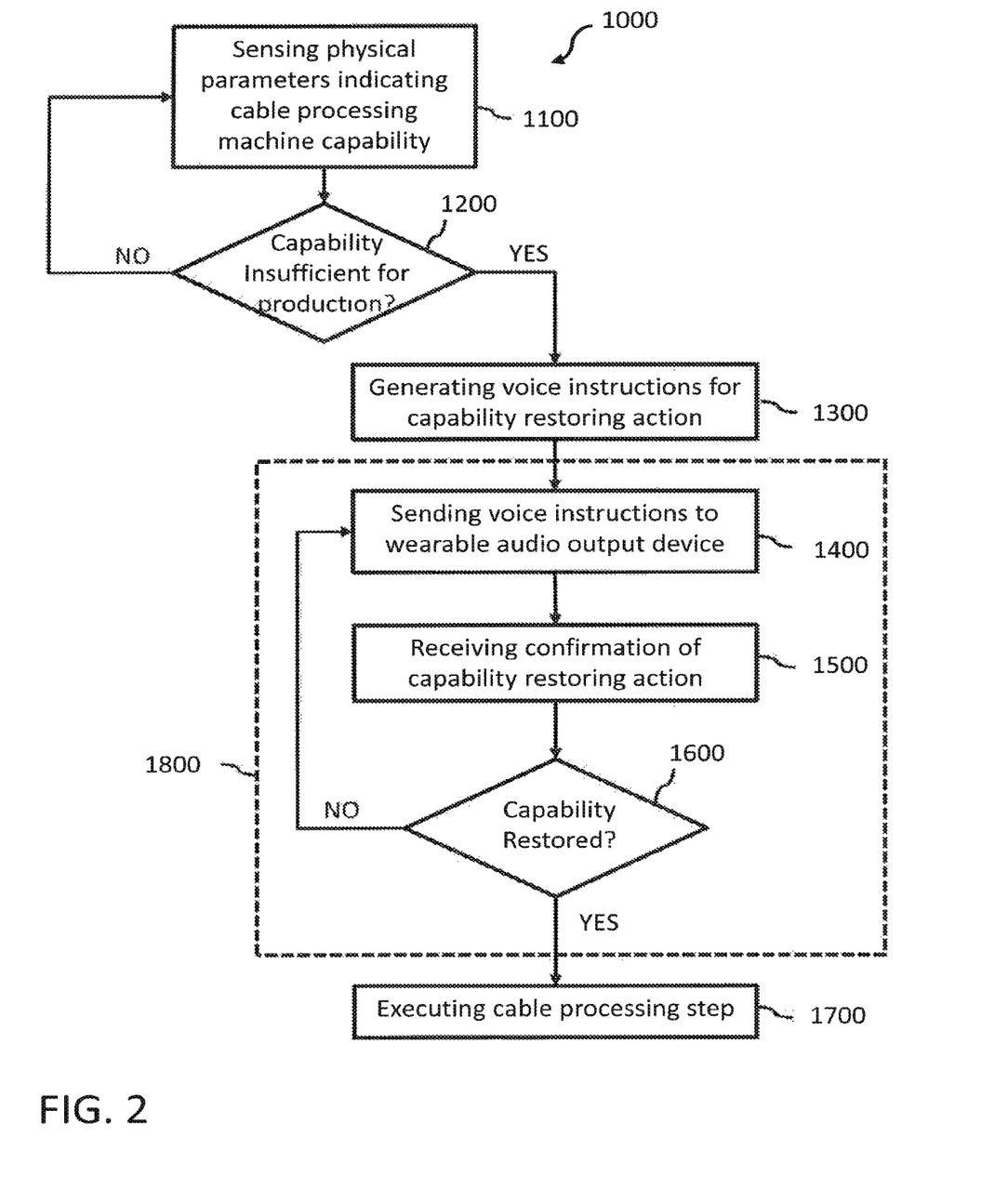
FIG. 2 is a simplified flow chart of a method for cable procession according to a version within the scope of the present disclosure.

The functions of the machine 100 shall now be explained in detail in the context of the cable processing method 1000 illustrated in FIG. 2. FIG. 2 is a simplified flow chart of a method for cable procession according to a version within the scope of the present disclosure.

The sensors S1, S2, S3 are used to measure or sense 1100 physical parameters P1, P2 indicating the capabilities of the respective cable processing tools PT1, PT2 for executing respective cable processing steps. In other words, the sensors may be used for a continuous monitoring of the machine tools with regards to their proper functioning in the cable processing process. For example, in case of the stripping tool PT1, the physical parameter P1 may be monitored as an indicator for the strip quality of the stripping tool PT1. The respective measurement method is disclosed in the published PCT application WO 2014/147596A1. A device is disclosed that may detect the contact of the blades of the stripping tool with the electrical conductor parts of the processed cable enclosed by an electrical insulation. A thin electrical insulation is provided between the tool and a tool retainer so that these components form a capacitor together with the coaxial cable. An inductor is connected in parallel therewith so that an LC oscillating circuit of high quality is formed between the tool and the tool retainer. The electronic circuit assembly excites the oscillating circuit and determines characteristic oscillation parameters of the oscillating circuit. Furthermore, for the cable processing, tool/conductor contacts may be weighted in dependence on contact duration and point in time within the cable-processing process, and thus quantitative production-rejection criteria may be determined. For example, the capacitive measurement of the physical contact parameter P1 by the sensor S1 may be performed fully automatically on board of the cable processing machine, and may reflect the technical status of the stripping tool in terms of a sufficient stripping quality. In case of contact detection, the blades have gone too deep and may have hurt the conducting parts of the cable (e.g., one of the strands of the cable). This imprecision of the tool bears the risk that the processed cable shall not be usable.

Figure 6:
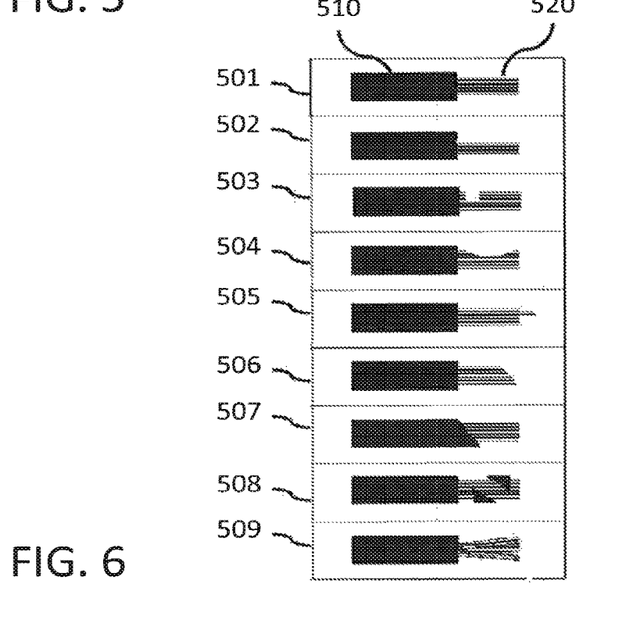
FIG. 6 illustrates the technical status indicator "strip quality".

Turning briefly to FIG. 6, an overview of possible stripping results 501 to 509 is given. Label 501 is a good strip result where the insulation material 510 is correctly removed from the cable end (over the correct length) and all conductive strands 520 of the cable are preserved as required. 502 is a stripping result where the blades have cut too deep cutting some strands that are now missing. This may result in bad conductivity, high resistance, bad mechanical robustness, etc. Labels 503 and 504 depict two scenarios where strands are notched or scratched, respectively. Labels 505 and 506 depict stripped cables with pulled strands and angled cut of strands resulting in a poorly defined cable length. Stripping result 507 shows an angled cut of insulation indicating that the positioning of the blades is incorrect. Stripping result 508 illustrates bad stripping quality because of insulation residues left on the strands. Label 509 shows spread strands. At least the stripping results 502, 503 and 504 would be identified by the contact detection sensor clearly indicating that the capability of the stripping unit for the cable stripping step is insufficient.

A further sensor S3 could complement the contact detection sensing, for example, with a visual inspection. For example, S3 may be a camera sensor coupled with an image processing device that is configured to recognize insufficient stripping results 505 to 509. S3 may be also an integral part of the machine 100. However, in general, sensors S1 to S3 may also be mounted on measurement devices external to the machine 100. In such a case, an operator may perform the capability checks on such measurement devices. The results may then be provided to the machine either by the sensors directly, or through interaction with the operator.

Figure 4:
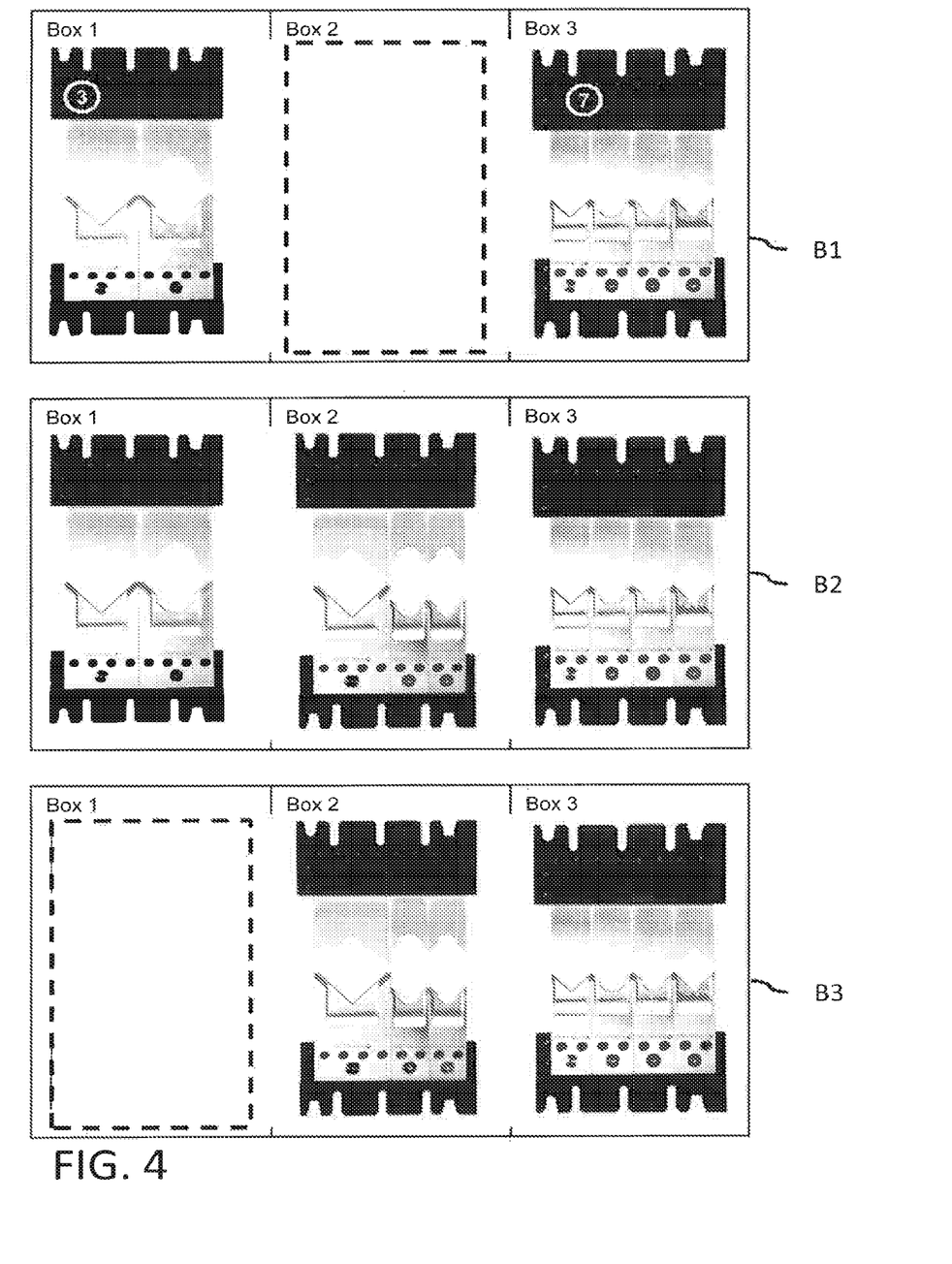
FIG. 4 illustrates the status of blade boxes during blade change actions.
Figure 5:
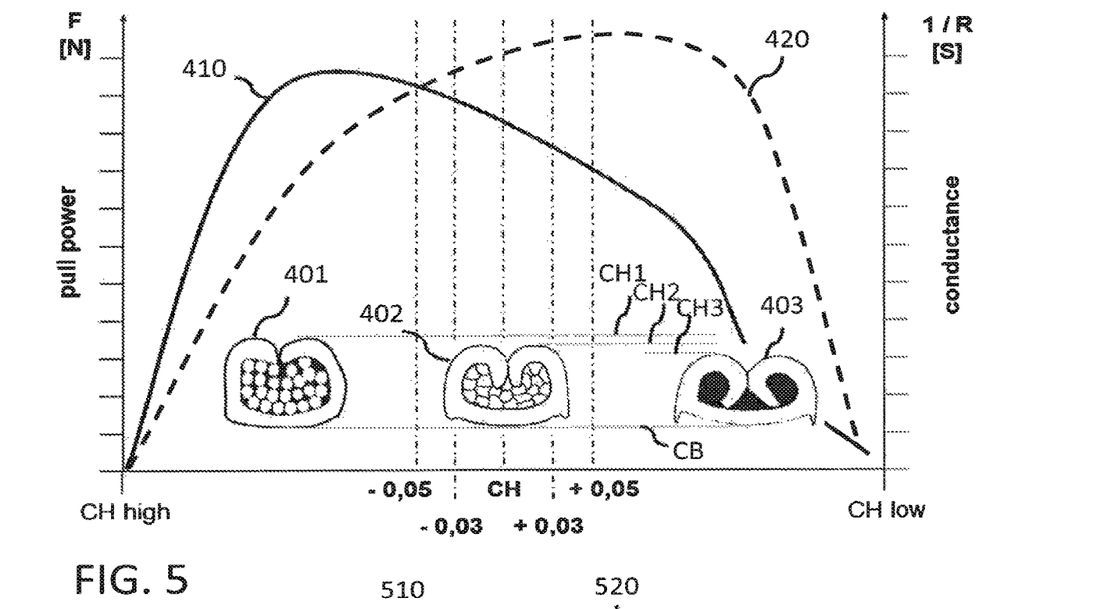
FIG. 5 illustrates the technical status parameter "crimp height"

Turning briefly to FIG. 5, a further example for a technical parameter is explained. FIG. 4 relates to the physical parameter P2 associated with the crimping tool PT2, which can be measured by sensor S2. The physical parameter P2 used in the example is the crimping height CH of a crimp, measured in relation to the crimping base CB. An ideal crimping result 402 with a crimping height CH2 is shown in the middle of FIG. 5. The ends of the crimp are sufficiently bent inwards and the power curve 410 (pull power) as well as the conductance curve 420 (1/R) is inside a well-acceptable tolerance range. Regarding the crimp result 401 on the left, the crimping was not strong enough and the crimp is not tight enough, also resulting in poor conductance value. This is reflected by the corresponding crimping height CH1. Regarding the crimp result 403 on the left, the crimping was too strong, and the conductance has suffered severely, which is reflected by the crimping height CH3. That is, a measured crimping height which is outside the tolerance range (e.g., dashed lines +/−3% around the ideal crimping height) CH2 indicates that the crimping capability of the crimping tool PT2 is insufficient and needs attention for readjustment. Of course, the tolerance range may depend on the precision requirements of the processed cables. This is illustrated by a second example tolerance range (dashed lines +/−5% around the ideal crimping height) CH2.

Turning back to FIGS. 1 and 2, the sensed physical parameter values P1, P2 reflecting the technical status of the stripping and crimping tools PT1, PT2 may be provided by the respective sensors S1, S2 (and optionally S3) to the capability determination component 110. The capability determination component 110 may then determine 1200 whether the capability of the respective processing tool is sufficient, or insufficient, for executing the corresponding cable processing step. In one embodiment, the capability determination component stores or has access to the tolerance ranges of the physical parameters associated with the various cable processing tools employed by the cable processing machine 100. As long as the sensed values are in predefined tolerance ranges, the values are continuously monitored and cable processing continues. When a sensor (S1 to S3) provides a measured physical parameter value P1, P2 being outside the respective tolerance range of the corresponding processing tool PT1, PT2 the capability determination component 110 determines that the capability of the said processing tool PT1, PT2 is insufficient to perform the cable processing step with adequate precision.

As a consequence, the cable processing is interrupted at the corresponding processing tool. For example, if an electric contact between the stripper blades and the cable strands is detected, the stripping tool is stopped. For example, if the measured crimping height is outside the tolerance range for good crimping results, the crimping tool is stopped.

The person skilled in the art can define appropriate technical parameters reflecting the capability of other cable processing tools used by the cable processing machine, and set tolerance ranges accordingly which can then be used by the capability determination component 110.

In one version, that may be combined with other disclosed versions, the physical parameter may be the elapsed processing time of a processing tool since the last setup, or the number of processing steps performed since the last setup. In this embodiment, the sensor may be a simple time-taker or counter to measure the elapsed processing time or the number of performed processing steps. The tolerance range in this version may simply be defined by a threshold value for the elapsed time or the performed number of steps. Once the threshold value is reached, the corresponding processing tool of the machine 100 is stopped because it is assumed that the capability of the tool may need to be restored.

In one version, a sensor recognizes that the to-be-processed cable has been changed. This may trigger a stop of all cable processing tools because of the underlying assumption that capabilities of the processing tools were adjusted to the previously processed cable and need now to be readjusted for the new cable material.

Once the capability determination component 110 has identified a need for restoring at least one of the machine's capabilities which needs the attention of an operator 10, the voice instruction generator component 130 generates 1300 voice instructions VI-1 for the operator 10, wherein the voice instructions are related to a particular action to be performed by the operator for restoring the capability of the cable processing machine. The voice instructions may be based on respective capability restoration data 120 stored in the memory of the machine 100, and are configured for audio output generation on a particular wearable audio output device 11 associated with the operator 10. The operator can confirm this instruction (OK). Confirmation can occur in any appropriate manner like for example, using voice control via an appropriate voice recognition unit of the machine 100, a keyboard entry, a mouse click, a gesture recognition user interface, etc.

In one version, the voice instructions VI-1 can be assembled by the generator 130 in a text format file which to be sent to the wearable audio output device and to be converted into natural spoken language by a standard text-to-speech converter running on the wearable device. In an alternative version, the voice instructions may be assembled by the generator 130 based on predefined audio snippets into an audio file that is immediately playable by a standard media player of the wearable audio output device 11. The terminology "audio snippets" as used herein is defined as short audio or sound files with spoken words that may be concatenated to result in said voice instructions.

The capability restoration data 120 includes the data needed by the generator 130 to generate the voice instructions in response to an identified capability gap of any one of the processing tools. For example, the capability restoration data can include a mapping data structure (e.g. a table, an XML file, an ontology, pointer structures, etc.) to define for each capability gap a corresponding workflow or action pattern which describes the action to be performed by the operator in order to restore the respective capability. Any appropriate format for such a description may be used (e.g., a graph, a flow chart, a table, etc.). In other words, for each sensed physical parameter value (reflecting a capability of a cable processing tool) which is outside its respective tolerance range a corresponding description of the action to be performed by the operator is stored in the capability restoration data 120. It is possible to provide an appropriate user interface enabling a user to modify existing action patterns or create new action pattern for particular capability restorations. Once the capability gap is identified by the determination component 110, the voice instruction generator 130 can retrieve the corresponding workflow or action pattern from the capability restoration data 120 and assemble the voice instructions accordingly.

Figure 3:
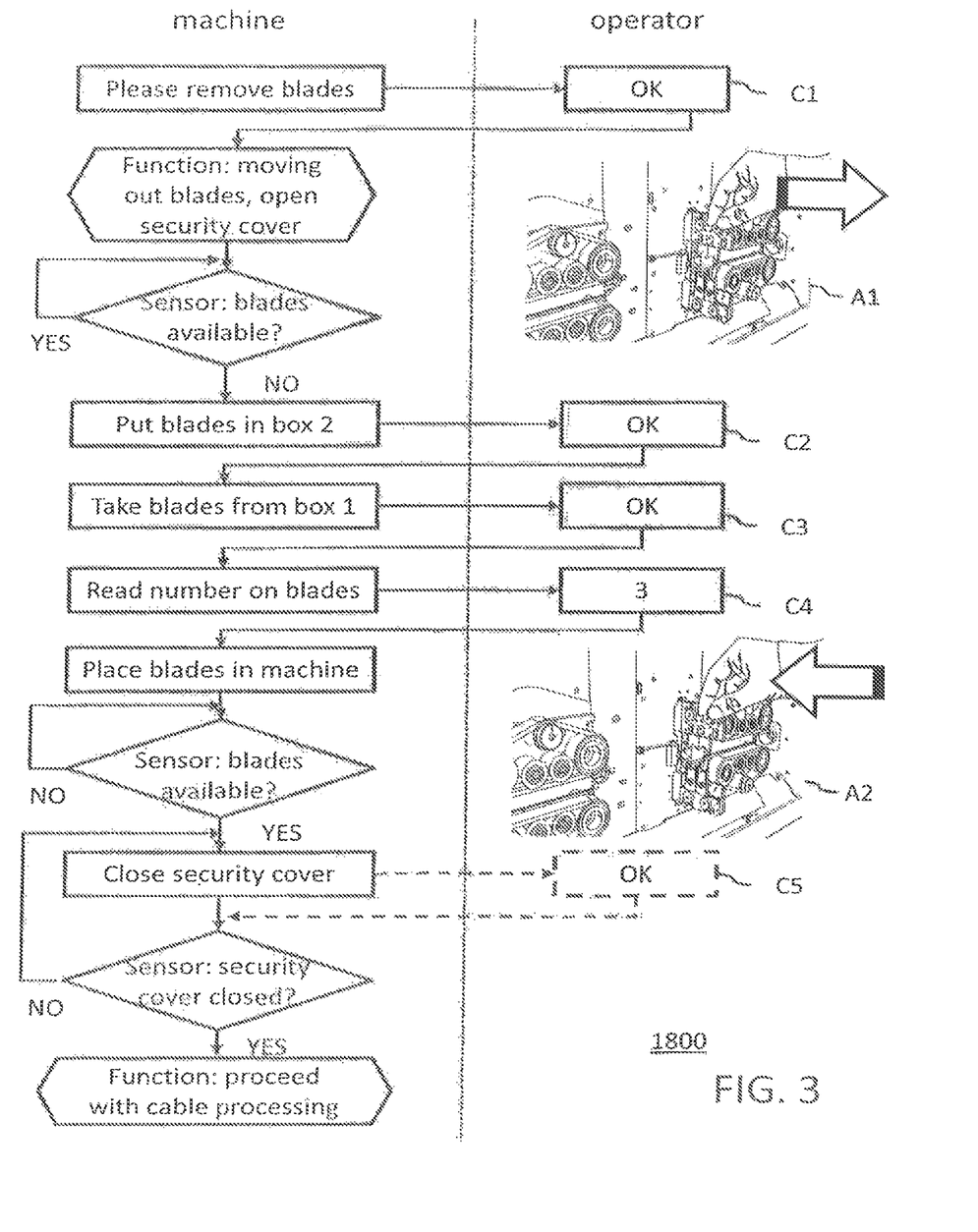
FIG. 3 is an example of a machine-operator dialogue using voice instructions.

Turning briefly to FIG. 3, an example is given for an action pattern 1800 that is associated with a capability gap of the stripping unit. It is assumed that the monitoring of the corresponding physical parameters has detected 1200 an insufficient capability regarding the technical status of the blades for the removal of the insulation, and that the machine has already stopped the stripping tool PT1.

In prior art solutions, the operator would perform the respective actions by using a manual, such as for example, the Schleuniger Reference Manual Edition 7.0 (05-2014)| PowerStrip 9550, page 80. Such a manual can be available in paper or in digital format. In both cases, the attention of the operator is at least partially directed to the manual instead of fully to the machine. Versions within the scope of the present disclosure may instruct the operator via voice instructions so that the operator can fully focus on the maintenance activities without a need for a manual at all. Further, the level of detail in the voice instructions can be adjusted to the skill level of the operator. For highly skilled operators, a reduced set of voice instructions may be sufficient, also reducing the number of confirmations required from the operator and, as a consequence, the overall time for restoring the machine's capability. On the other hand, if an operator with a lower skill level is instructed, a more detailed action pattern may be used dependent on the skill level of the operator. A more detailed action pattern may include voice instructions that have a work instruction granularity similar to the one shown in the above reference manual (e.g., instructions for loosening screws, etc.).

According to a version within the scope of the present disclosure, the voice instruction generator 130 identifies the corresponding action pattern 1800 for changing the stripping blades via the mapping structure in the capability restoration data 120. The example action pattern 1800 of FIG. 3 shows the voice instructions of the machine 100 for the operator on the left hand side as rectangle boxes and the expected operator responses on the right hand side as rectangle boxes. Each rectangle on the machine side may be subject to text-to-speech generation, or may be associated with a predefined audio snippet. The example action pattern in FIG. 3 may be appropriate for an operator with a relatively high skill level because the granularity of the voice instructions is rather low (not many details are included in the instructions).

Once the stripping tool has been stopped, the first voice instruction "Please remove blades" is sent 1400 to the wearable audio output device of the operator. The operator can confirm the instructions with "OK" C1. Then the machine 100 automatically moves out the used blades and automatically opens the security cover of the machine. The result of this step is illustrated by the picture A1. Sensors can recognize whether the blades are already taken by the operator or whether they are still available in the machine. As soon as the sensor recognizes that the blades are removed by the operator, the next voice instruction "Put blades in box 2" is generated and sent to the wearable audio output device. FIG. 4 illustrates the status B1, B2, B3 of boxes box 1, box 2 and box 3 during the blade change actions. Initially (status B1) box 2 is empty. Status B2 shows the status after the operator has put the used blades into box 2. Once confirmed C2 by the operator, the next instruction is generated and sent: "Take blades from box 1". The status B3 in FIG. 4 illustrates the result with an empty box 1 after the operator has followed the instructions. Once confirmed C3 the operator is further instructed: "Read number on blades". In response to the confirmation C4 ("3") by the operator the next voice instruction "Place blades in machine" is generated and sent. When the machine senses that the new blades are available, it generates the instruction "close security cover". The situation after the blades have been placed in the machine is illustrated by the picture A2. In this case the OK-confirmation C5 of the operator is optional because internal sensors can automatically determine the technical status of the security cover. Only if the cover is closed accordingly may the stripping tool resume cable stripping. Different types of blades as used in the boxes of FIG. 4 are described in the above mentioned Schleuniger Reference Manual, for example, on page 57.

Turning back to FIG. 2, the closing of the security cover in the scenario of FIG. 3 can be seen as the final confirmation received 1500 by the confirm component 140 that the capability of the stripping tool is fully restored 1600 and that the machine can continue with the execution 1700 of the respective cable processing steps. As illustrated by the example of FIG. 3, the sending 1400 and receiving confirmation 1500 steps may correspond to a whole series of sending and receiving steps, wherein each sending 1400 step provides voice instructions related to a particular part of the action pattern which needs to be performed by the operator, and wherein the corresponding receiving confirmation 1500 steps confirm the completion of the particular part by the operator. In other words, the sending and receiving confirmation steps are iteratively repeated until all corresponding parts of the corresponding action pattern were processed by the voice instruction generator 130 and confirm components 140 accordingly, and a final confirmation about the completion of the entire "restoring capability" action is received by the confirmation component.

In the example, a final confirmation from the operator (optional OK box) was received. This optional confirmation is complemented in the example by a confirmation signal received from sensors of the machine confirming the closing of the security cover. This indicates that the entire action for restoring the stripping capability is completed.

The machine can then validate 1600 this confirmation, and checks if the capability is really restored. In the example, for this purpose, the sensors for checking the availability of the blades in the machine may be used. If the sensor data confirms that the blades are available in the machine, and that the security cover is closed, then the validation is successful. The machine has now proven, that the capability of the stripping tool is restored, and proceeds with executing 1700 the cable processing step cable stripping.

It merits attention to also explain some optional versions. As illustrated in FIG. 1 by dashed arrows, the confirm component 140 may receive confirmation from various sources. As depicted by the example, the operator may provide direct confirmation feedback either through his wearable device, or using any other appropriate human machine interaction interface. The confirmation may also be received from any sensor inside or outside the machine 100, or it may be provided by the respective processing tool itself.

Regarding the capability validation step 1600, the capability determination component 110 may also require a test measurement of the respective physical parameters before releasing the machine for execution of a regular cable processing step. For example, after the change of the blades, the sensors for detecting the electrical contact between the new blades and the cable strands may provide or prove that the capability for removing insulation without hurting the cable is restored. The person skilled in the art can define which physical parameter values need to be checked for validating restored capability of other processing tools. Those parameters include, but are not limited to: closure size of a straightener tool, gripper pressure of a gripper tool, strip quality achieved by a stripping tool, crimp height achieved by a crimp tool.

Method steps may be performed by one or more programmable processors executing a computer program to perform functions of the disclosure, by operating on input data and generating output. Method steps can also be performed by, and apparatus of the present disclosure may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computing device. Generally, a processor will receive instructions and data from a read-only memory or a random access memory or both. The essential elements of a computer are at least one processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Such storage devices may also provisioned on demand and be accessible through the Internet (Cloud Computing). Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

In order to provide for interaction with an operator, there may be implementation on a cable processing machine or machine center having input/output means, such as a display device, for example, a cathode ray tube (CRT) or liquid crystal display (LCD) monitor, for displaying information to the user; and an input device such as a keyboard, touchscreen or touchpad, a pointing device, e.g., a mouse or a trackball, by which the user may provide input to the computer. Other kinds of devices may be used to provide for interaction with a user as well. For example, feedback provided to the user may be any form of sensory feedback, as for example visual feedback, auditory feedback, or tactile feedback; and input from the user may be received in any form, including acoustic, speech, tactile or visual (for example, gaze control or the like) input.

Implementations within the scope of the present disclosure may be implemented in a cable processing machine with a computing component that includes a back-end component, for example, as a data server, or that includes a middleware component, for example, an application server, or that includes a front-end component, for example, a client computer having a graphical user interface or a Web browser through which a user can interact with an implementation, or any combination of such back-end, middleware, or front-end components. Client computers may also be mobile or wearable devices, such as smartphones, tablet PCs or any other handheld computing device. The components of the system may be interconnected by any form or medium of digital data communication, for example, a communication network. Examples of communication networks include a local area network (LAN) and a wide area network (WAN), e.g., the Internet or wireless LAN or telecommunication networks.

A network may include clients and servers. A client and server are generally remote from each other and typically interact through a communication network. The relationship of client and server arises by virtue of computer programs running on the respective computers and having a client-server relationship to each other.

Finally, it should be noted that the term "comprising" does not exclude other elements or features, and that use of the terms "a" or "an" does not necessarily exclude a plurality, in the sense that singular reference of an element does not exclude the plural reference of such elements. The verb 'comprise' and its conjugations do not exclude the presence of elements or steps other than those listed in any claim or the specification as a whole. The mere fact that certain features may be recited in mutually different dependent claims does not necessarily indicate that a combination of these features cannot possibly be used to advantage. Furthermore, features described in association with different versions may possibly be combined. It should be noted that the above-mentioned examples, and versions illustrate rather than limit the invention, and that those skilled in the art will be capable of designing alternative implementations without departing from the scope of the invention as defined by the appended claims. As equivalent elements may be substituted for elements employed in claimed invention to obtain substantially the same results in substantially the same way, the scope of the present invention is defined by the appended claims, including known equivalents and unforeseeable equivalents at the time of filing of the present application. Thus, in closing, it should be noted that the invention is not limited to the abovementioned versions and exemplary working examples. Further developments, modifications and combinations are also within the scope of the appended patent claims and are placed in the possession of the person skilled in the art from the present disclosure. Accordingly, the techniques, systems, and structures described and illustrated previously herein should be understood to be illustrative and exemplary, and not necessarily limiting upon the scope.

What is claimed is:

1. A method (1000) for processing a cable on a cable processing machine (100), the method comprising:
   sensing (1100), by at least one sensor (S1, S2, S3) associated with the cable processing machine, at least one physical parameter (P1, P2) indicative of a capability of the cable processing machine for executing a cable processing step;
   based on the sensed at least one physical parameter (P1, P2), determining (1200), by at least one processor of the cable processing machine, that the capability is insufficient for executing the cable processing step;
   generating (1300), by the cable processing machine, voice instructions (VI-1) for an operator (10), with the voice instructions related to a particular action to be performed by the operator (10) for restoring the capability of the cable processing machine to enable the execution of the cable processing step, wherein the voice instructions are based on respective capability restoration data (120) and are configured for audio output generation on a particular wearable audio output device (11) associated with the operator (10);

sending (1400) the generated voice instructions, by the cable processing machine, to the particular wearable audio output device (11);

receiving (1500) confirmation, at the cable processing machine, that the particular action is completed;

validating (1600), by the cable processing machine, whether the capability is restored; and if the capability is restored, executing (1700), by the cable processing machine, the cable processing step.

2. The method of claim 1, further comprising selecting the at least one physical parameter value from the group consisting of:

a closure size of a straightener tool,
gripper pressure of a gripper tool,
a strip quality achieved by a stripping tool, or
a crimp height achieved by a crimp tool.

3. The method of claim 1, wherein generating (1300) voice instructions includes generating at least one sound file or generating at least one text file, based on the respective capability restoration data.

* * * * *